(12) United States Patent
Yonetsu et al.

(10) Patent No.: US 7,147,950 B2
(45) Date of Patent: Dec. 12, 2006

(54) LIQUID FUEL-HOUSING TANK FOR FUEL CELL AND FUEL CELL

(75) Inventors: Maki Yonetsu, Yokahama (JP); Masahiro Takashita, Kawasaki (JP); Hiroyasu Sumino, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 347 days.

(21) Appl. No.: 10/315,101

(22) Filed: Dec. 10, 2002

(65) Prior Publication Data

US 2003/0082421 A1    May 1, 2003

Related U.S. Application Data

(62) Division of application No. 09/653,458, filed on Aug. 31, 2000, now Pat. No. 6,506,513.

(30) Foreign Application Priority Data

Sep. 21, 1999    (JP)    ................... 11-267211

(51) Int. Cl.
*H01M 8/04*    (2006.01)
*H01M 2/00*    (2006.01)
*H01M 10/44*    (2006.01)

(52) U.S. Cl. ............... 429/25; 429/34; 429/50

(58) Field of Classification Search ........... 429/25, 429/34, 50
See application file for complete search history.

(56) References Cited

U.S. PATENT DOCUMENTS

| | | | |
|---|---|---|---|
| 3,176,882 A | 4/1965 | Meermans | |
| 3,507,708 A | 4/1970 | Vignaud | |
| 4,562,123 A * | 12/1985 | Shimizu et al. | ............... 429/27 |
| 4,760,865 A | 8/1988 | Rilett | |
| 4,828,943 A | 5/1989 | Pritchard | |
| 5,259,412 A | 11/1993 | Scott et al. | |
| 5,354,626 A | 10/1994 | Kobayashi et al. | |
| 5,432,023 A * | 7/1995 | Yamada et al. | ............... 429/34 |
| 5,460,135 A * | 10/1995 | Ohashi et al. | ............... 123/518 |
| 5,506,067 A | 4/1996 | Tinker | |
| 5,723,229 A | 3/1998 | Scheifers et al. | |
| 5,932,365 A | 8/1999 | Lin et al. | |
| 5,976,725 A | 11/1999 | Gamo et al. | |
| 6,057,051 A | 5/2000 | Uchida et al. | |
| 6,194,095 B1 | 2/2001 | Hockaday | |
| 6,217,315 B1 | 4/2001 | Mifune et al. | |
| 6,447,941 B1 * | 9/2002 | Tomimatsu et al. | ........... 429/26 |

FOREIGN PATENT DOCUMENTS

JP    39-23591    10/1964

(Continued)

*Primary Examiner*—Dah-Wei Yuan
(74) *Attorney, Agent, or Firm*—Oblon, Spivak, McClelland, Maier & Neustadt, P.C.

(57) ABSTRACT

Disclosed is a fuel cell comprising a fuel cell body (stacked body) including a unit cell having an electromotive section in which an electrolyte membrane is sandwiched between a fuel electrode and an oxidant electrode, and a liquid fuel tank for storing a liquid fuel that is to be supplied to the fuel cell body and connected to the fuel cell body. The liquid fuel is introduced by the capillary action into the unit cell included in the fuel cell body and vaporized within the unit cell so as to be supplied to the fuel electrode, thereby generating an electric power. The liquid fuel tank is provided with a pressure adjusting mechanism for introducing a required amount of the liquid fuel from a liquid outlet port into the unit cell.

7 Claims, 9 Drawing Sheets

FOREIGN PATENT DOCUMENTS

| | | |
|---|---|---|
| JP | 41-8512 | 4/1966 |
| JP | 60-86744 | 6/1985 |
| JP | 4-93519 | 3/1992 |
| JP | 4-103961 | 4/1992 |
| JP | 4-249865 | 9/1992 |
| JP | 6-188008 | 7/1994 |
| JP | 10-325538 | 12/1998 |
| WO | WO/98/53253 | 11/1998 |

* cited by examiner

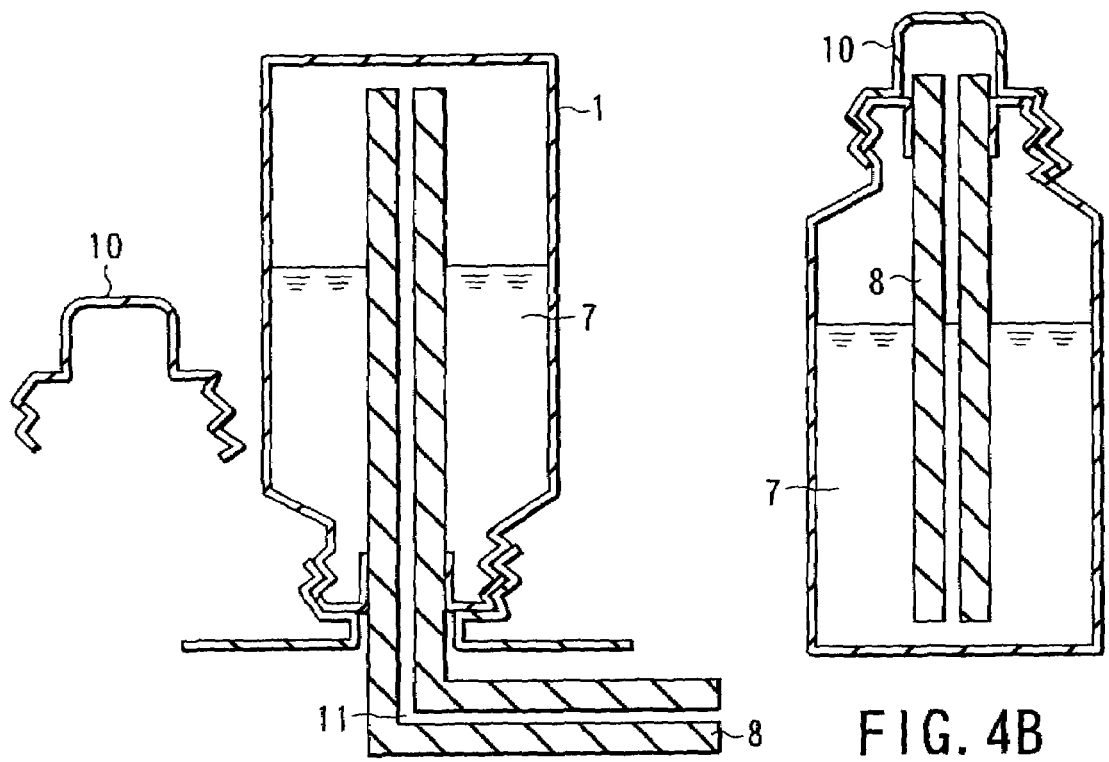
FIG. 4A
FIG. 4B
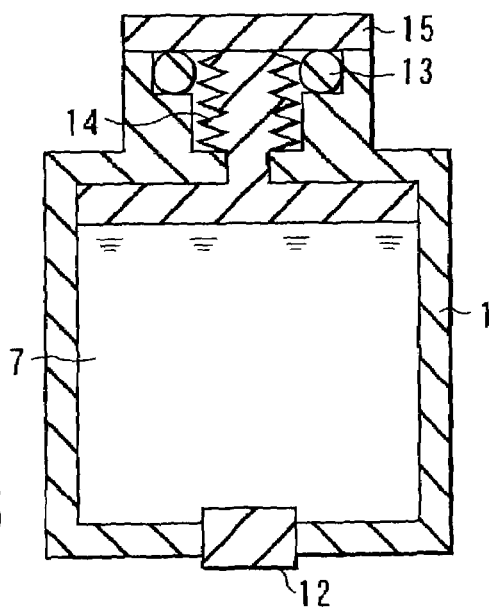
FIG. 5

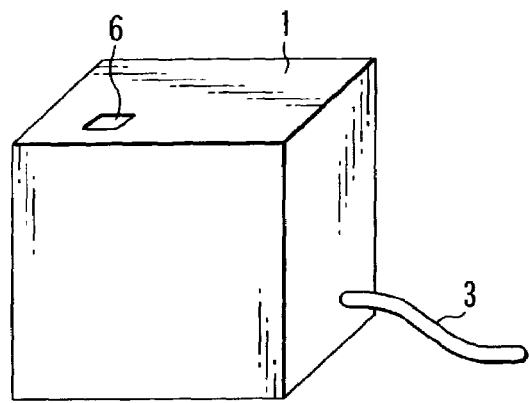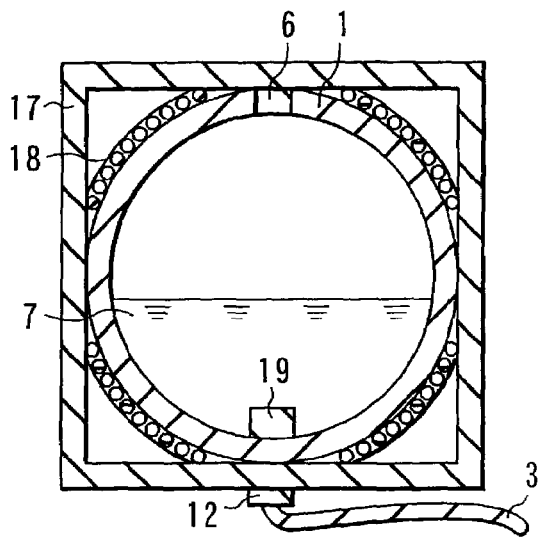
FIG. 8A      FIG. 8B
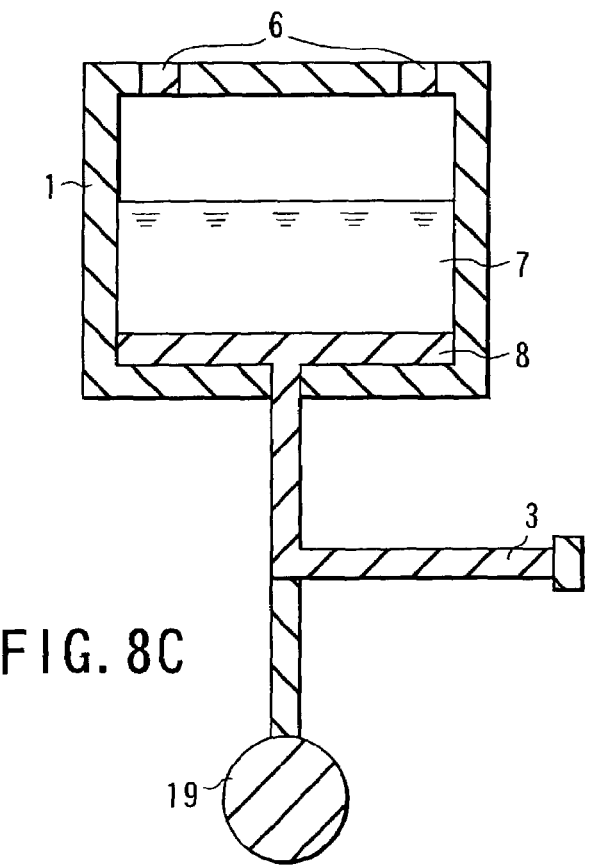
FIG. 8C

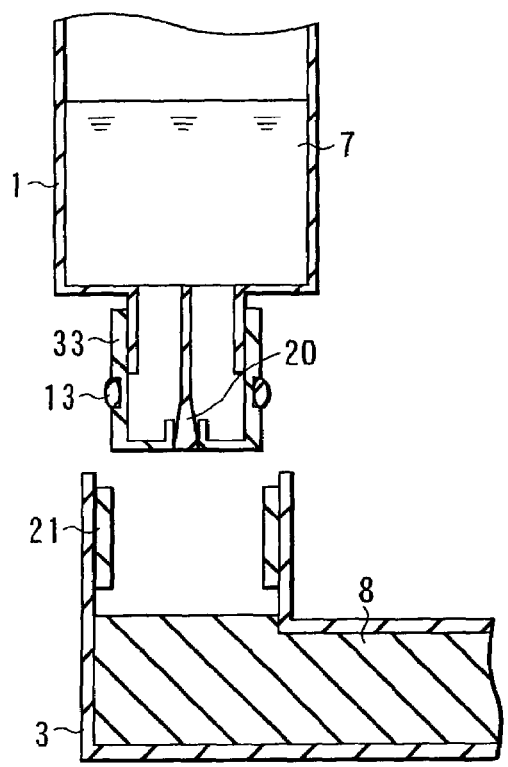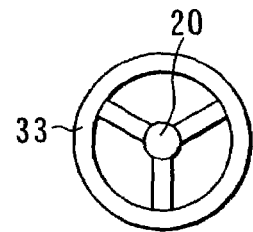
FIG. 10A  FIG. 10B
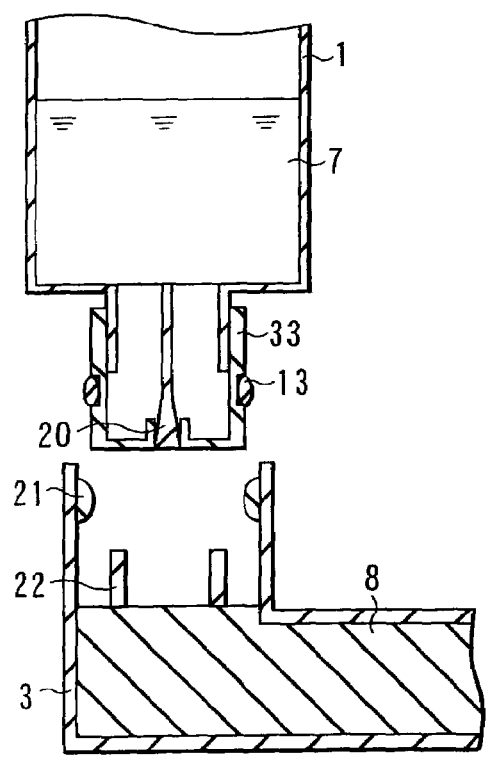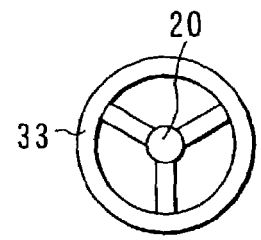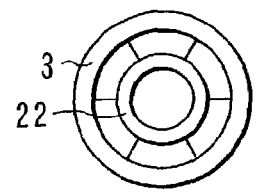
FIG. 11A  FIG. 11B  FIG. 11C

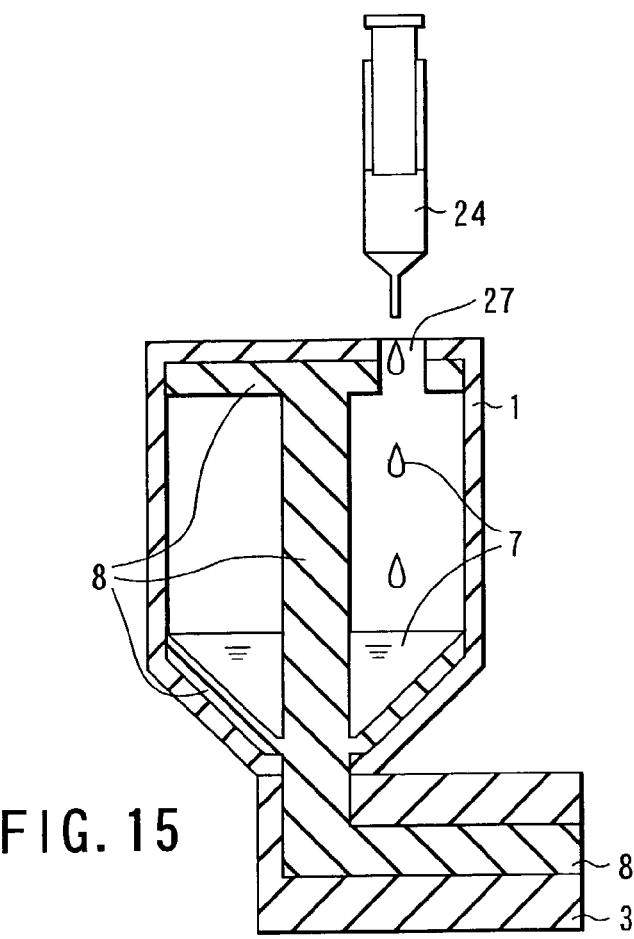
FIG. 15
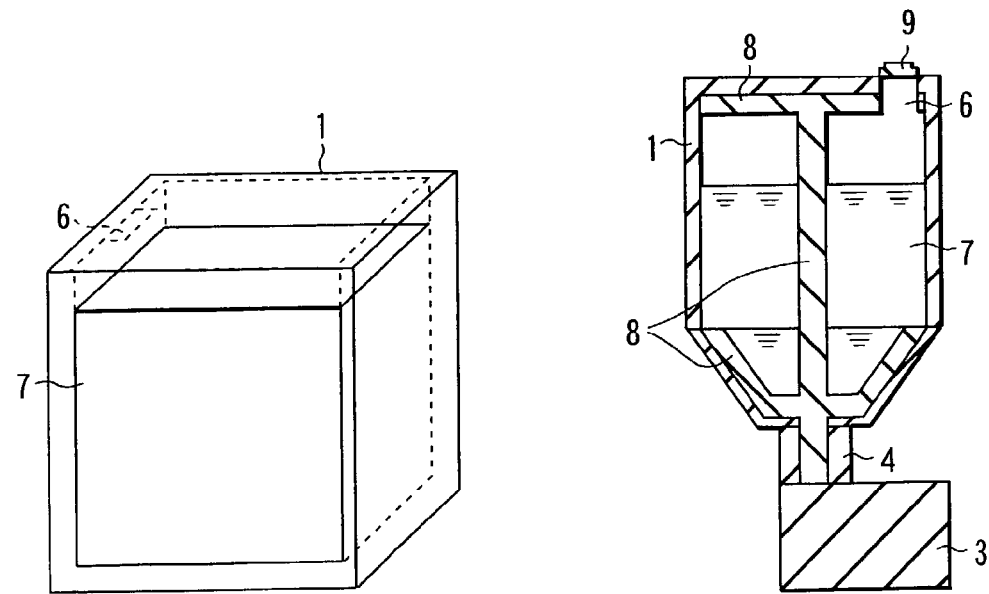
FIG. 16A
FIG. 16B

LIQUID FUEL-HOUSING TANK FOR FUEL CELL AND FUEL CELL

CROSS-REFERENCE TO RELATED APPLICATIONS

This application is based upon and claims the benefit of priority from the prior Japanese Patent Application No. 11-267211, filed Sep. 21, 1999, the entire contents of which are incorporated herein by reference.

BACKGROUND OF THE INVENTION

The present invention relates to a fuel cell, particularly, to a liquid fuel cell adapted for miniaturization and a tank for housing a liquid fuel used for the fuel cell.

There are various types of liquid fuel cells such as liquid fuel cells of a vapor feed type, those utilizing a capillary action, and etc.

The fuel cell of the conventional vapor feed type makes it possible to use directly a liquid fuel of a high concentration and, thus, is advantageous in terms of miniaturization of the fuel section. However, since the system is complex, it is necessary to use auxiliary machines, making it difficult to miniaturize the fuel cell as it is. On the other hand, the liquid fuel cell of the conventional direct liquid feed type is adapted for miniaturization in terms of the construction of the fuel cell. However, since fuel is supplied directly in the liquid form to a fuel electrode, it is unavoidable to use fuel of a low concentration. It follows that the inner volume of a fuel tank must be enlarged, making it difficult to achieve miniaturization of the entire system.

Further, in order to take out power of the fuel cell stably, fuel is required to be supplied stably. In the conventional fuel cell, a liquid fuel is forcedly supplied to the cell body by using, for example, a liquid feed pump. However, it was difficult to supply stably a just required amount of the fuel because the conventional tank was not equipped with a mechanism for adjusting the pressure within the tank. If the pressure of the fuel tank is rendered negative, compared with the fuel cell body, it is impossible to take out further the liquid fuel from the tank, leading to a lowered power. On the other hand, where the pressure on the side of the liquid storing portion is rendered markedly high, a liquid fuel is supplied in an amount larger than that required to the fuel cell body, with the result that the fuel cell body is filled with an excessively large amount of the liquid fuel so as to markedly deteriorate the components of the fuel cell body. Alternatively, if the pressure inside the liquid storage section is markedly increased, the liquid fuel tank tends to be ruptured, which is highly dangerous. In any of the small fuel cells disclosed to the public, the liquid fuel tank is not equipped with a pressure adjusting mechanism for adjusting both the negative pressure and the excessively high pressure, which leads to the problem that it is impossible to take out the output with a high stability.

Further, a special volatile solution, e.g., a mixture of methanol and water, is used as the fuel for the fuel cell, the fuel inlet connected to the fuel cell body is required to be hermetically sealed from the outside. In the case of using a mixed fuel solution comprising liquid materials of different volatility, the composition would tend to change over time; the most volatile material evaporating first. Since the cell output is dependent on the fuel concentration, the concentration of the fuel should be maintained constant. However, if the fuel tank is hermetically sealed, especially at the inlet, the volatile components of the fuel are not evaporated ensuring stable output of the fuel cell.

Particularly, where a liquid fuel is supplied to a small fuel cell, new problems are brought about. In the case of a large fuel cell, the cell need not be moved nor used in various directions. On the other hand, in the case of a small fuel cell, it is required that the cell can be used in various directions like the dry cell. In other words, it is required that a liquid fuel be supplied to the fuel cell body with a high stability in any direction of mounting the fuel cell body. This is a problem that is generated only when the cell is miniaturized. Of course, it is very important to solve this problem. Also, this problem provides a very serious obstacle that must be overcome for using a fuel cell practically as a small power source.

It is required that the fuel be taken out from the tank stably so as to obtain a stable output, and that the fuel cell has the high performance of the initial rising characteristics. Since the rising characteristics depends on the initial flow rate of the fuel from the fuel tank into the fuel-cell body, it is necessary to supply the fuel promptly to the fuel cell body. In other words, it is required that the fuel tank has a mechanism for promptly supplying the fuel in the initial period.

For getting a stable output, it is necessary that the fuel tank for the fuel cell has a following characteristics which the conventional fuel tank doesn't have. First a mechanism that prevents the liquid storage section from bearing a negative pressure or an excessively high pressure, compared with the fuel cell body. Second, a mechanism that permits the fuel to be supplied with a high stability in any direction. And last, a mechanism that permits the fuel to be supplied promptly in the initial rising period.

BRIEF SUMMARY OF THE INVENTION

An object of the present invention, which has been achieved in an attempt to overcome the above-noted problems inherent in the conventional fuel cell so as to provide a small fuel cell useful as a battery for a small equipment, is to provide a highly reliable fuel cell, which permits simplifying the liquid fuel supply system, which permits supplying a liquid fuel with a high stability, and which is stable in its output.

According to a first aspect of the present invention, there is provided a liquid fuel tank for a fuel cell, comprising a pressure adjusting mechanism which maintains constant the pressure within the tank so as to permit a required amount of the liquid fuel to be discharged from a liquid outlet port to the outside of the tank.

Also, according to a second aspect of the present invention, there is provided a fuel cell, comprising:

a fuel cell body equipped with a unit cell having an electromotive section in which an electrolyte membrane is held between a fuel electrode and an oxidant electrode; and a liquid fuel tank housing a liquid fuel that is to be supplied to the fuel cell body and is connected to the fuel cell body;

wherein the liquid fuel is introduced into the unit cell by a capillary action within the fuel cell body and the liquid fuel is vaporized within the unit cell so as to be supplied to the fuel electrode for the power generation, and the liquid fuel tank is equipped with a pressure adjusting mechanism which introduces a required amount of the liquid fuel from a liquid outlet portion into the unit cell.

Also, according to the third aspect of the present invention, there is provided a fuel cell, comprising:

a fuel cell body equipped with a unit cell having an electromotive section in which an electrolyte membrane is held between a fuel electrode and an oxidant electrode; and a liquid fuel tank housing a liquid fuel that is to be supplied to said fuel cell body and is connected to the fuel cell body;

wherein said liquid fuel is introduced into said unit cell by a capillary action within the fuel cell body and the liquid fuel is vaporized within the unit cell so as to be supplied to the fuel electrode for the power generation, said liquid fuel tank is equipped with a pressure adjusting mechanism which introduces a required amount of the liquid fuel from a liquid outlet port into the unit cell, and a connecting section between said liquid fuel tank and said fuel cell body is hermetically sealed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general-description given above and the detailed description of the preferred embodiments given below, serve to explain the principles of the invention.

FIGS. 4A and 4B schematically show collectively as another example the construction of a liquid fuel tank for a fuel cell of the present invention;

FIG. 5 schematically shows as another example the construction of a liquid fuel tank for a fuel cell of the present invention;

FIGS. 8A to 8C schematically show collectively as another example the construction of a liquid fuel tank for a fuel cell of the present invention;

FIGS. 10A and 10B collectively show as an example the construction of a connecting section between a liquid fuel tank for a fuel cell of the present invention and an inlet pipe;

FIGS. 11A to 11C collectively show as another example the construction of a connecting section between a liquid fuel tank for a fuel cell of the present invention and an inlet pipe;

FIG. 15 schematically shows as another example the construction of a liquid fuel tank for a fuel cell of the present invention;

FIGS. 16A and 16B schematically show collectively as another example the construction of a liquid fuel tank for a fuel cell of the present invention;

DETAILED DESCRIPTION OF THE PREFERRED EMBODIMENTS

The present invention will now be described in detail with reference to the accompanying drawings.

Figure 1:
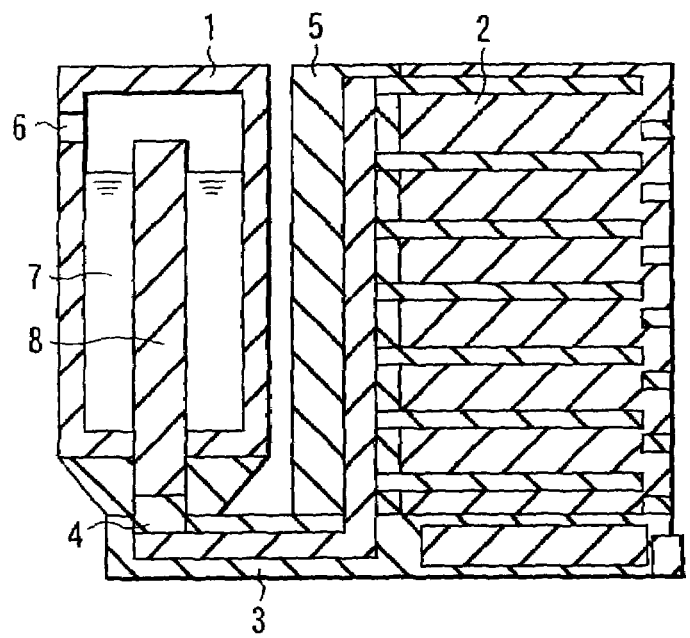
FIG. 1 schematically shows the construction of a fuel cell according to one embodiment of the present invention.

FIG. 1 schematically shows the construction of a gist portion of a fuel cell using a liquid fuel tank of the present invention. Incidentally, the fuel cell shown in FIG. 1 is just an example of the fuel cell using a liquid fuel tank of the present invention. The arrangement of the components of the fuel cell and the sizes of these components are not limited to those shown in the drawing.

Figure 2:
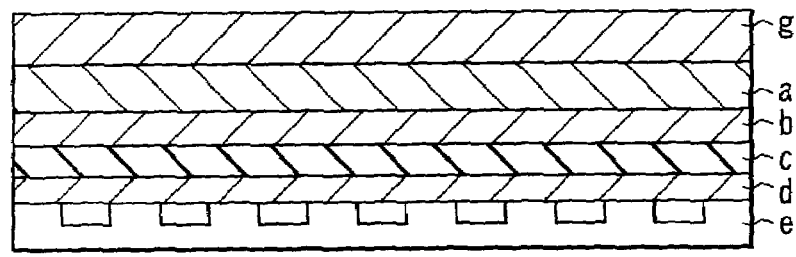
FIG. 2 is a cross sectional view showing the construction of a unit cell included in the fuel cell of the present invention.

The fuel cell shown in FIG. 1 consists essentially of a liquid fuel tank 1, a stacked body 2, and a pathway 3 for introducing a liquid fuel from the liquid fuel tank 1 into the stacked body 2. In general, an air blowing-sucking mechanism (not shown) such as a fan is also arranged for supplying an oxidizing gas. The stacked body 2 shown in the drawing consists of a plurality of unit cells stacked one upon the other, each unit cell having an electromotive section including an electrolyte membrane sandwiched between a fuel electrode and an oxidant electrode. It is possible to use a unit cell in place of the stacked body consisting of a plurality of unit cells. FIG. 2 exemplifies the construction of the unit cell. As shown in the drawing, the unit cell consists of a vaporizing plate a, an anode b, an electrolyte membrane c, a cathode d, and a gas channel e. In stacking a plurality of unit cells one upon the other, a separator is interposed between two adjacent unit cells.

The pathway 3 can be formed of such a fine tube as to perform a capillary function. Alternatively, it is possible for the pathway 3 to be filled with a porous material through which permeates a liquid fuel in order to assist the liquid fuel introduction. As the liquid permeating material, it is possible to use, for example, a porous material such as carbon, a metal or a polyaniline, a porous material such as a vinyl polymer, an engineering plastic, or a thermosetting resin, ceramics porous body such as a silica porous body or an alumina porous body, a porous film such as a fluorocarbon polymer, polyethylene, polypropylene, polycarbonate, polyimide, polysulfone, polysulfide, or polybenzimidazol, a porous material of sponges such as polyurethane, polyester, cellulose, or phenol resin, and paper. Where the material surface is poor in wettability with the fuel, it is possible to apply a surface treatment so as to improve the wettability.

In the fuel cell of the present invention shown in the drawing, the liquid fuel tank 1 is connected to the pathway 3 at a connection section 4. It is required that the connection section 4 is hermetically sealed. If the sealing property at the connecting section is not enough, the liquid fuel tends to be evaporated. The liquid fuel used in the present invention includes, for example, alcohols such as methanol, ethanol, or propanol, ethers such as diethyl ether, and hydrazine. Particularly, methanol is used in the form of a mixed solution together with water. Where the ratio of the contents is changed by evaporation, various problems occur. Naturally, it is desirable to prevent evaporation of the liquid fuel as much as possible. It follows that it is required that the connecting section 4 between the tank 1 and the pathway 3 should be hermetically sealed such that the alcohol evaporation can be prevented under atmospheric pressure.

In order to introduce the liquid fuel into each unit cell within the stacked body 2 uniformly and stably, it is possible to set a kind of a liquid fuel holding material called a receiver 5. The liquid fuel is further introduced from the receiver 5 into each unit cell through a liquid fuel permeating material. To be more specific, the introduced liquid fuel is vaporized in a vaporizing section arranged in front of the fuel electrode within the unit cell and, then, further introduced into the fuel electrode.

As the liquid fuel is introduced into the unit cell by a capillary force in the fuel cell of the present invention, it is not necessary to use a driving section for the fuel supply such as a pump. And as the liquid fuel introduced into the unit cell is vaporized within a fuel vaporizing layer by utilizing the reaction heat of the cell reaction, it is not necessary to use auxiliary equipment such as a fuel evaporator. Also, since the gaseous fuel within the fuel vaporizing layer is kept substantially saturated, the liquid fuel is vaporized in the amount of the gaseous fuel consumed by cell reaction in the vaporizing layer, and the liquid fuel is introduced into the unit cell by the capillary action to supply the vaporized portion alone.

Further, since the fuel supply amount is interlocked with the amount of the fuel consumption, it is substantially impossible that the unreacted fuel is discharged to the outside of the fuel cell in the fuel cell of the present invention, making it unnecessary to set a processing system at the fuel outlet, like the conventional liquid fuel cell. In other words, the liquid fuel can be supplied smoothly in the fuel cell of the present invention without using auxiliary equipment such as a pump, a blower, a fuel evaporator, and condenser, making it possible to miniaturize the fuel cell.

In the present invention, the liquid fuel tank 1 is equipped with a mechanism for adjusting the inner pressure in order to supply the liquid fuel with a high stability to the fuel vaporizing layer. In order to supply the liquid fuel with a high stability to the fuel vaporizing layer, it is necessary to use a mechanism that permits the liquid fuel to flow out of the liquid fuel tank 1 in accordance with the consumed amount of the liquid fuel within the vaporizing layer. For example, it is necessary to use a mechanism for avoiding a negative pressure, i.e., a mechanism for taking in the air from outside the tank in accordance with the flow of the liquid fuel out of the fuel tank. As a result, it is possible to prevent the inner pressure of the fuel tank from becoming negative relative to the cell body. To be more specific, a fine hole 6 can be formed as a mechanism against the negative pressure on the side wall in the upper portion of the fuel tank 1 as shown in FIG. 1. It is possible to form a plurality of fine holes. Also, it is desirable for the diameter of the fine hole, which is not particularly limited in the present invention, to fall within a range of between about 0.2 mm and 5 mm, in view of the effect of preventing evaporation of an excessive amount of the liquid fuel.

Figure 3:
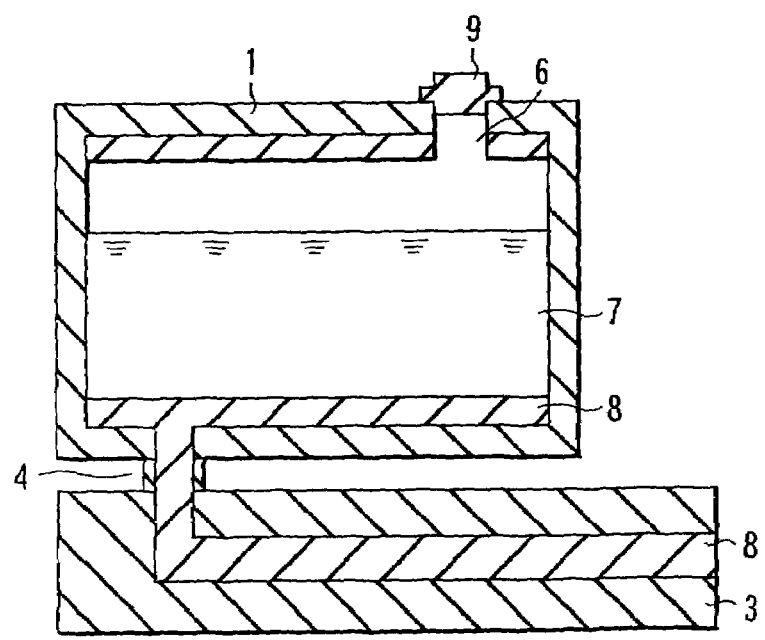
FIG. 3 schematically shows as an example the construction of a liquid fuel tank for a fuel cell of the present invention.

It is possible to mount a removable film an the fine hole 6. Also, a lid 9 can be mounted to the fine hole 6, as shown in FIG. 3. The fine hole 6 can be exposed to the outside by removing the film or the lid 9, as desired, so as to introduce the outer air into the fuel tank 1.

Alternatively, a selectively permeable membrane can be mounted to the fine hole 6. A selectively permeable membrane required to have a low permeability of the vaporized material of the liquid fuel component and relatively high permeability of a gas such as the air. The selectively permeable membrane can be formed of, for example, a fluorocarbon-based FEP resin. The thickness of the selectively permeable membrane, which is dependent on the kind and components of the liquid fuel used, and the saturated vapor pressure, etc., should be generally about 10 µm to 1000 µm.

In the present invention, a mechanism to prevent the negative pressure can be utilized by positively introducing the gas component generated in the stacked body (fuel cell body) 2 into the liquid fuel tank 1. For example, it is possible to arrange in combination a liquid fuel permeating material 8 for supplying a liquid fuel and a gas introducing fine tube 11 for introducing the gas generated in the stacked body 2 into the liquid fuel tank 1 within the liquid fuel tank 1, as shown in FIGS. 4A and 4B. It is possible to set the gas introducing fine tube 11 inside the liquid fuel permeating material 8 to extend along the liquid fuel permeating member 8. To be more specific, it is possible to employ a double layer structure consisting of the fuel permeating material 8 for transferring the liquid fuel and the gas introducing fine tube 11, which is set inside of the fuel permeating material, for introducing gas generated in the stacked body 2 into the liquid fuel tank 1. However, the present invention is not limited to the particular construction described above. Specifically, it is possible to combine the fuel permeating material 8 for transferring the liquid fuel and the gas introducing fine tube 11 for introducing gas generated in the stacked body 2 into the liquid fuel tank 1 by an optional method within the liquid fuel tank 1.

FIG. 4A shows that the liquid fuel tank us connected to the pathway 3. The liquid fuel permeating material 8 and the gas introducing fine tube 11 extends to reach the stacked body 2 (not shown). Where the liquid fuel tank 1 is not connected to the pathway 3, the liquid fuel tank 1 is covered with a lid 10 so as to prevent a liquid fuel 7 housed in the tank I from being vaporized, as shown in FIG. 4B.

Incidentally, where the pressure of the gaseous portion within the liquid fuel tank 1 is excessively increased by, for example, the temperature elevation, the liquid fuel tends to be excessively supplied from the liquid fuel tank 1 into the stacked body 2 in accordance with the pressure increase. Further, the increase in the inner pressure of the liquid fuel tank 1 tends to cause rupture of the tank 1, which is dangerous. In order to avoid such a problem, it is desirable to arrange a pressure releasing mechanism for releasing the pressure when the inner pressure of the tank 1 has reached a predetermined high pressure. For example, it is considered effective to arrange a pressure release valve 15, which is operated by a spring 14 and an O-ring 13, in a part of the liquid fuel tank 1, as shown in FIG. 5. It is also effective for releasing the pressure to arrange a protective film that is ruptured under a pressure higher than a predetermined level.

The pressure within the liquid fuel tank 1 can be adjusted by arranging the above-described mechanism for taking a measure against a negative pressure or mechanism for taking a measure against an excessively high pressure.

Further, in the case of the power source for a small equipment, the fuel should have a high stability regardless of the direction in which the fuel cell body (stacked body) is arranged. Particularly, in the case of using a liquid fuel, the fuel supply tends to be stopped, which makes the output fall down if the whole system has no device for supply of the fuel. Also, such causes the problem in the initial start-up characteristics. In the fuel cell of the present invention, it is desirable for the liquid fuel to flow smoothly from the liquid fuel tank connected to the stacked body 2 regardless of the direction in which the stacked body 2 is arranged.

Figure 6A:
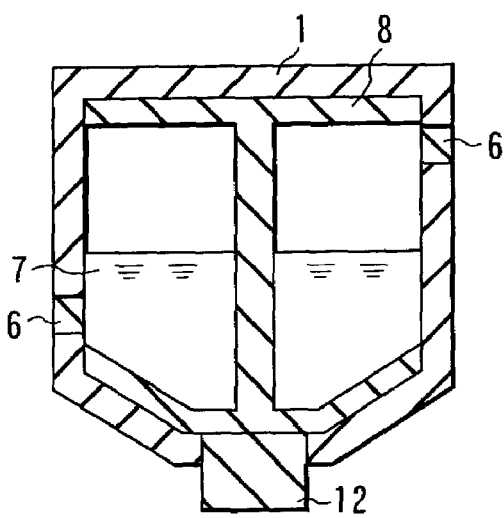
FIGS. 6A and 6B schematically show collectively as another example the construction of a liquid fuel tank for a fuel cell of the present invention.
Figure 6B:
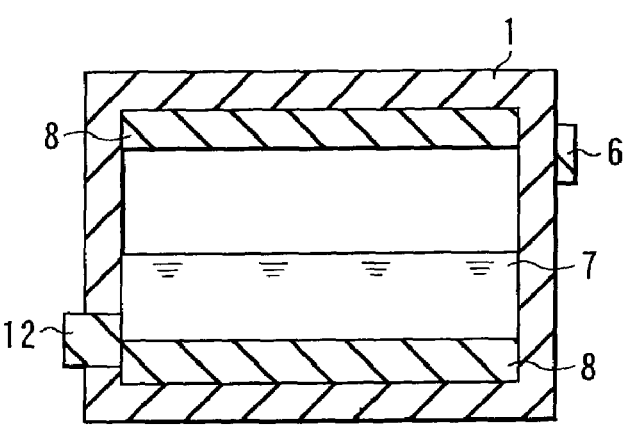

To be more specific, it is desirable to arrange the liquid fuel permeating material 8 within the liquid fuel tank 1 for expending to reach a fuel outlet port 12, as shown in FIGS. 6A and 6B. In the liquid fuel tank 1 shown in FIG. 6A, the liquid fuel permeating material 8 is arranged within the tank 1 on the inner surface where the liquid fuel outlet port 12 is formed and on the inner surface opposite to that where the liquid fuel outlet port 12 is formed. In each surface, the liquid fuel permeating material 8 is arranged to cover the inner surface of the liquid fuel tank 1. These liquid fuel permeating material 8 arranged on the two inner surface regions are connected to each other by the similar material like the liquid fuel permeating material 8. By arranging the liquid fuel permeating material 8 within the liquid fuel tank 1 in this fashion, the liquid fuel permeating material 8 is always partly kept in contact with the liquid fuel 7. It follows that the liquid fuel 7 can be supplied to the liquid fuel outlet port 12 regardless of the direction of the liquid fuel tank.

On the other hand, in the liquid fuel tank 1 shown in FIG. 6B, the liquid fuel permeating material 8 is arranged in two mutually facing regions of the inner wall of the liquid fuel tank 1. As in the arrangement shown in FIG. 6A, the liquid fuel permeating material 8 is arranged to cover each of the mutually facing regions noted above. These two liquid fuel permeating materials 8 are in contact with the fine hole 6 formed on the outer wall of the fuel tank 1 for taking in the outer air and with the fuel outlet port 12. Since at least a part of the liquid fuel permeating material 8 is kept in contact with the liquid fuel, the liquid fuel can be supplied to the fuel outlet port 12 regardless of the direction of the tank 1 arrangement. Incidentally, where the liquid fuel tank 1 shown in FIG. 6B is turned upside down, the fine hole 6 for taking the outer air and the fuel outlet port 12 perform the opposite functions, i.e., the fine hole 6 acts as the fuel outlet port and the fuel outlet port 12 acts as the air-intake hole.

Figure 7A:
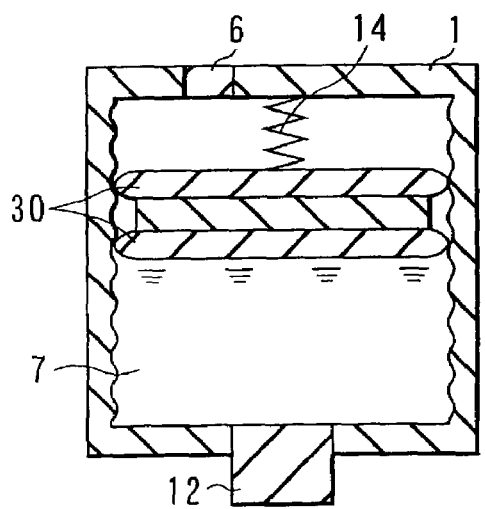
FIGS. 7A and 7B schematically show collectively as another example the construction of a liquid fuel tank for a fuel cell of the present invention.
Figure 7B:
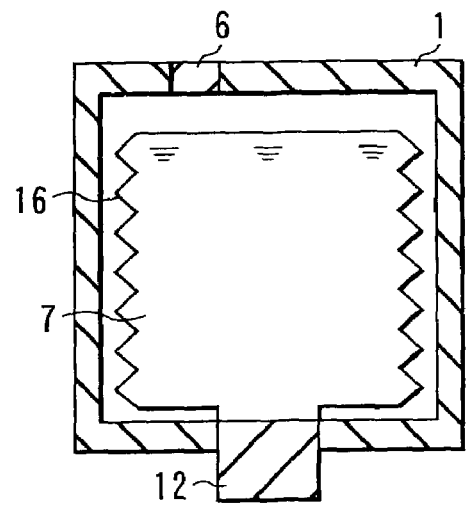

It is also possible to construct the liquid fuel tank such that the liquid fuel within the tank is kept pushed to the liquid fuel outlet section by a pressurizing mechanism. FIGS. 7A and 7B show the particular construction. Specifically, in the liquid fuel tank shown in FIG. 7A, a fuel sealing part 30 is pushed by a spring 14, and the liquid fuel 7 is pushed out through the fuel outlet port 12. In the fuel tank shown in FIG. 7B, the liquid fuel 7 is housed in a bellows-shaped storage section 16 and pushed out through the fuel outlet port 12 by the function of the storage section itself.

Incidentally, it is possible to utilize the sealed gas pressure in place of the mechanical pressure such as the spring force for pushing out the liquid fuel. For the gas used as the sealing gas which is not particularly limited, it is desirable to use an inert gas such as an argon gas or a nitrogen gas.

Further, it is possible to use a mechanism for rotating the liquid fuel tank 1 itself or at least the liquid fuel storage section alone as shown in FIGS. 8A to 8C.

In the liquid fuel tank 1 shown in FIG. 8A, the pathway 3 for taking out the liquid fuel is formed of a flexible material and, thus, the liquid fuel tank 1 can be arranged such that the-liquid fuel outlet port 12 is positioned in the lower portion regardless of the direction of the fuel cell body, i.e., stacked body, (not shown).

The liquid fuel tank 1 shown in FIG. 8B is spherical and is supported within a support frame 17. A weight 19 is arranged in a predetermined position within the liquid fuel tank 1. Also, a bearing 18 is arranged between the support frame 17 and the liquid fuel tank 1. The particular construction permits the storage section to be freely swung by 360° so as to make the fuel outlet port 12 positioned below the storage section regardless of the direction of fuel cell body, i.e., the stacked body, (not shown).

Further, in the liquid fuel tank shown in FIG. 8C, since the weight 19 is provided, the fuel outlet port 12 always positioned below the storage section. Further, the liquid fuel permeating material 8 is arranged within the liquid fuel tank 1 to reach the liquid fuel outlet port 12. It follows that the liquid fuel 7 can be supplied to the stacked body (not shown) as far as the liquid fuel is in contact with the liquid fuel permeating material 8.

In any of the cases described above, the other fuel permeating material is arranged between at least the liquid fuel tank and the liquid fuel permeating material of the cell body, i.e., the stacked body. The particular construction is employed in the present invention because, in the case of the fuel cell constructed such that the fuel permeating material is dipped directly in the liquid fuel in the liquid fuel tank, it was impossible to supply the liquid fuel with a high stability to the cell body (stacked body). Particularly, where the fuel cell is positioned in various directions, the phenomenon described above occurs prominently. For example, where the fuel storage section was arranged on the upper side of the electrode, an excessively large amount of the fuel was supplied into the cell body. Further, the hermetic sealing properties at the fuel storage section and the cell body were not satisfactory, and the fuel is caused flow backward from the cell body into the liquid fuel tank.

In order to avoid the problem described above, the fuel cell should not be constructed such that the fuel permeating material is inserted directly into the liquid fuel tank. To be more specific, it is required that the fuel cell is constructed such that the liquid fuel is once withdrawn from the liquid fuel tank by a permeating material differing from the liquid fuel permeating part and, then, the fuel is supplied from the permeating material into the liquid fuel permeating material 8. It is necessary to arrange at least one permeating material and it is possible to use second and third permeating materials. Where a plurality of permeating materials are used, the liquid fuel should be transferred smoothly from the liquid fuel tank to the fuel electrode. It follows that it is needed to use only the permeating material that is absolutely required. If the number of permeating materials is increased, it is difficult to transfer the liquid fuel smoothly between the permeating materials themselves. In addition, since the distance between the fuel and the fuel electrode is increased, it tends to take a long time for the initial rising of the fuel cell. The number of permeating materials and the positions of the permeating materials are determined by the positional relationship between the liquid fuel tank and the cell body. Naturally, it is desirable to arrange the permeating material in the shortest distance from the fuel outlet port of the liquid fuel tank and not to make the entire volume increased.

Figure 19:
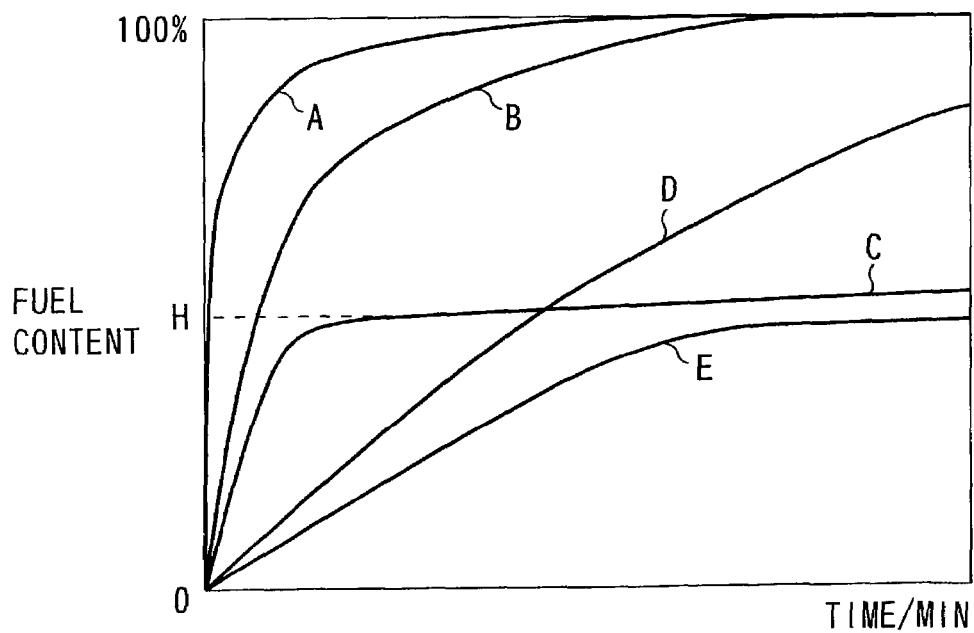
FIG. 19 is a graph showing the change with time in the fuel content.

It should also be noted that, since a special liquid such as a mixture of alcohol having a high volatility and water is used as the fuel for the fuel cell, the permeating material is required to exhibit the material characteristics adapted for the liquid fuel. What is particularly required is a satisfactory permeating rate. The permeating rate is determined to be a rate of increase in the fuel content in the material at 25° C. in the case where a permeating material having a size of 5 cm (width)×10 cm (length)×3 mm (thickness) is erected upright when dipped by 2 cm in a liquid fuel having a concentration of 10 mols/L (liter). FIG. 19 is a graph showing the change with time in the fuel content. The slope of each of the curves shown in the graph represents the rate of increase in the fuel content.

The fuel content is determined as follows. First, the entire permeating material is dipped in the liquid fuel to permit the inner region of the permeating material to be saturated with the fuel and, then, the permeating material is withdrawn from the liquid fuel. In this case, the weight of the fuel contained in the permeating material is set at 100. The permeating rate is measured by the method described above, and the weight of the liquid fuel (%) at a certain time is determined as the fuel content at the particular time.

In the permeating rate thus specified, it is desirable for an average sucking rate v(%/min) in the initial 5 minutes to be as high as possible. To be more specific, it is desirable for the average sucking rate to be $5 \leq v$ like curve B shown in FIG. 19. It is more desirable for the average sucking rate to be $6.5 \leq v$ like curve A shown in FIG. 19.

If v is less than 5 like curve D shown in FIG. 19, it takes long time for the initial rising, making it difficult to use the permeating material in the fuel cell. It is also a problem that the saturation point h of the fuel content is low like curve C shown in FIG. 19.

It is desirable for the saturation point h of the fuel content to fall within a range of between 40 and 100, i.e., $40 \leq h \leq 100$. If h is lower than 40, the fuel retention rate of the permeating material at the saturated point is low and, thus, particularly where the permeating material is high, it is impossible to supply the liquid fuel to the upper portion of the permeating material. Therefore, it is required that an absorbing material has a value of h falling within the range noted above. In order to increase the sucking rate v, what is important is the wettability of the surface of the material with the liquid fuel. In the case of using a material with poor wettability, a surface treatment can be done on the material so as to improve the wettability.

In the case of using the permeating material having the characteristics of v and h falling within the ranges described above in the fuel cell of the present invention, the fuel was supplied smoothly and it was possible to obtain a stable output without the deterioration of the characteristics. The material used in the present invention includes, for example, a porous body such as carbon, a metal or a polyaniline, a porous body such as a vinyl polymer, an engineering plastic material, or a thermosetting resin, a ceramic porous body such as a silica porous body or an alumina porous body, a porous film such as a fluorocarbon resin film, a polyethylene film, a polypropylene film, a polycarbonate film, a polyimide film, a polysulfone film, a polysulfide film or a polybenzimidazol film, a sponge-like porous material such as polyurethane, polyester, cellulose or a phenolic resin, and paper.

As described above, a liquid fuel tank, which can supply a liquid fuel with a high stability regardless of the direction of the fuel cell body (stacked body), is used in the present invention. As a result, the environment in which the fuel cell of the present invention is used is not limited, and the fuel cell of the present invention can be used in a wide field.

Further, in view of the fact that the fuel used in the fuel cell of the present invention is in the form a liquid, it is desirable for the connecting section between the liquid fuel tank and the cell body (stacked body) to be constructed such that the liquid fuel does not leak when transferred from the liquid fuel tank into the cell body so as to ensure a stable supply of the liquid fuel. Particularly, where the liquid fuel has a relatively high vapor pressure, the detachable liquid fuel tank should be desirably constructed such that the liquid fuel is not vaporized under the stored condition.

Figure 9A:
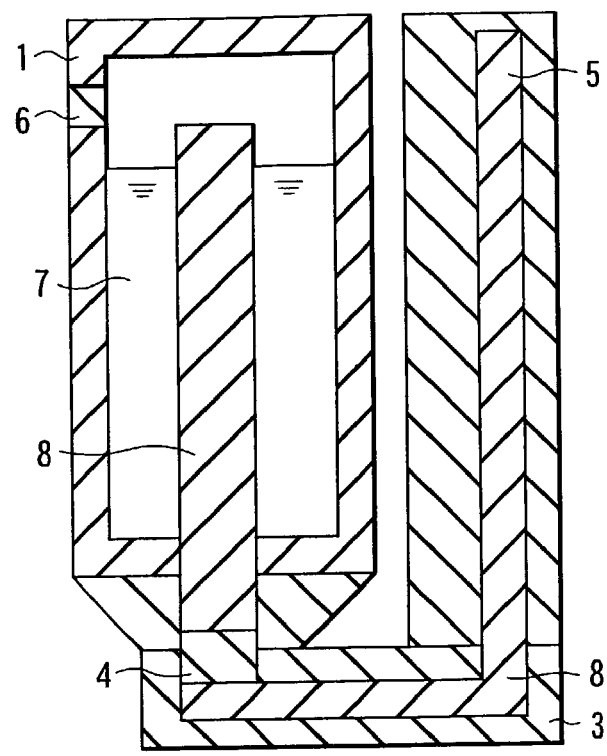
FIG. 9A schematically shows as another example the construction of a liquid fuel tank for a fuel cell of the present invention.
Figure 9B:
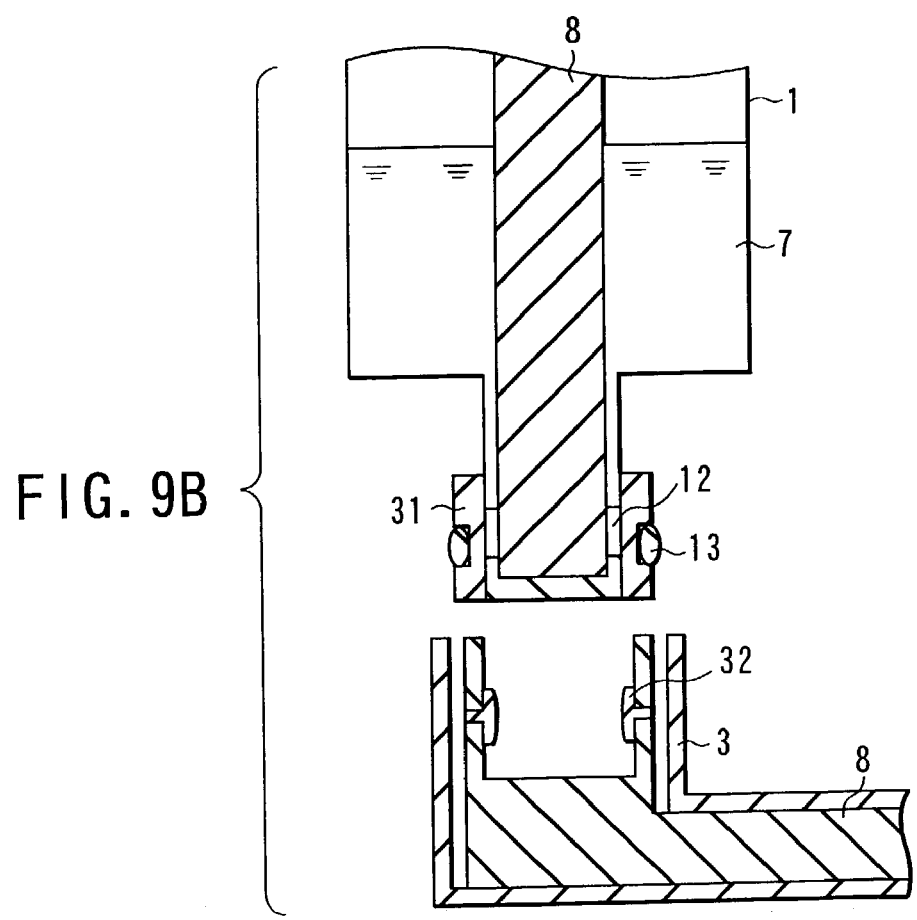
FIG. 9B schematically shows as an example the construction of a liquid fuel tank for a fuel cell of the present invention and an inlet pipe.

FIGS. 9A and 9B show examples of the liquid fuel tank constructed in view of the requirement described above. Specifically, FIG. 9A shows the state that the liquid fuel tank 1 is connected to the pathway 3. As shown in the drawing, the liquid fuel permeating material 8, i.e., a material through which the liquid fuel easily permeates, is arranged within the liquid fuel tank 1 to reach the liquid fuel outlet port. Also, the similar liquid fuel permeating material 8 is arranged within the pathway 3. The liquid fuel 7 is supplied through the liquid fuel permeating material 8 to the receiver 5 arranged with the fuel cell body (stacked body).

Before the liquid fuel tank 1 of the particular construction is connected to the pathway 3, it is possible to mount the lid 10 as shown in FIG. 4B to cover the fuel outlet port so as to prevent the liquid fuel housed in the liquid fuel tank 1 from being vaporized. Alternatively, it is also possible to mount an opening-closing lid to the fuel outlet port so as to prevent the vaporization of the liquid fuel. Where the tank 1 is connected to the pathway as shown in FIG. 9A, the fuel permeating material 8 is exposed to the outside by detaching the lid of the tank 1 mounted to the fuel outlet port or by opening the lid mounted to the fuel outlet port so as to be connected to the pathway 3.

FIG. 9B exemplifies the construction of the connecting section 4 shown in FIG. 9A. As shown in the drawing, a cylindrical lid 31, which can be opened or closed, is slidably mounted around the fuel outlet port 12 of the liquid fuel tank 1, and a permeating material connecting pad 32 is mounted to the inner wall of the pathway 3. When the liquid fuel tank 1 of the particular construction is connected to the pathway 3, the outlet port opening-closing lid 31 is pushed upward so as to bring the outlet port 12 of the tank 1 into contact with the permeating material connection pad 32 of the pathway 3. If the fuel outlet port 12 is brought into contact with the permeating material connecting pad 32, the liquid fuel is transferred from the tank 1 into the pathway 3 by the capillary action.

It is possible to construct the liquid fuel tank 1 such that the liquid fuel 7 flows out only when the tank 1 is connected to the fuel cell body (stacked body). FIGS. 10A, 10B, 11A to 11C and 12 exemplify the connecting section between the liquid fuel tank and the pathway, covering the case where the liquid fuel tank is constructed as described above.

In the example shown in FIG. 10A, a slidable connecting section 33 and a tapered-angle central shaft 20 are arranged within the fuel outlet port of the liquid fuel tank 1. FIG. 10B is a plan view showing the flow out port. As shown in FIG. 10A, a projection 21 is formed on the inner wall of the pathway 3. When the pathway 3 is inserted into the liquid fuel tank 1, the connecting section 33 is pushed upward by the projection 21. Since the tapered-angle central shaft 20 is upwardly tapered, the fine hole at the tip of the connecting section 33 is opened as the connecting section 33 is pushed upward, with the result that the liquid fuel 7 is allowed to flow from the liquid fuel tank 1 into the pathway 3.

The connecting section shown in FIG. 10A can be modified as shown in FIG. 11A. In the modification shown in FIG. 11A, a boss 22 for pushing upward the connection section 33 of the fuel tank 1 when the fuel tank 1 is inserted into the pathway 3 is formed inside the pathway 3. The other construction is equal to that shown in FIG. 10A. Incidentally, FIGS. 11B and 11C are plan views showing the outlet section of the fuel tank 1 and the pathway 3, respectively. Since the tapered-angle central shaft 20 is tapered upward in the example shown in FIG. 11, too, the fine hole at the tip of the connecting section 33 is opened as the connecting section 33 is moved upward so as to permit the liquid fuel 7 to flow from the liquid fuel tank 1 into the pathway 3.

Figure 12:
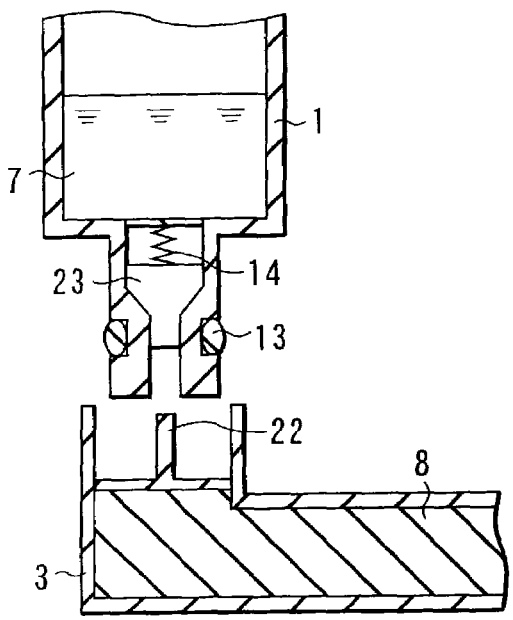
FIG. 12 schematically shows as another example the construction of a connecting section between a liquid fuel tank for a fuel cell of the present invention and an inlet pipe.

It is also possible to arrange the connecting section as shown in FIG. 12. In the example shown in FIG. 12, a fuel outflow control valve 23 is mounted to the outflow section of the fuel tank 1 by a spring 14. On the other hand, a boss 22 for pushing the valve 23 upward when the fuel tank 1 is connected to the pathway 3 is mounted within the pathway 3. It follows that, when the liquid fuel tank 1 is connected to the pathway 3, the valve 23 mounted to the fuel tank 1 is pushed upward by the boss 22 so as to release the outflow hole and, thus, the liquid fuel 7 is supplied into the pathway 3.

By the particular technique, it is possible to mount a mechanism that permits ensuring both the storing properties of the liquid fuel and the stable supply of the liquid fuel when the tank 1 is connected to the pathway 3 within the connecting section of the fuel tank. Where the liquid fuel tank of the particular construction is connected to the fuel cell body, it is possible to obtain a fuel cell of a high reliability. It should be noted that the O-ring 13 for hermetically sealing the liquid fuel, which is shown in each of FIGS. 9A to 12, can be mounted on the side of the connecting section or on the side of the fuel cell body.

Figure 13:
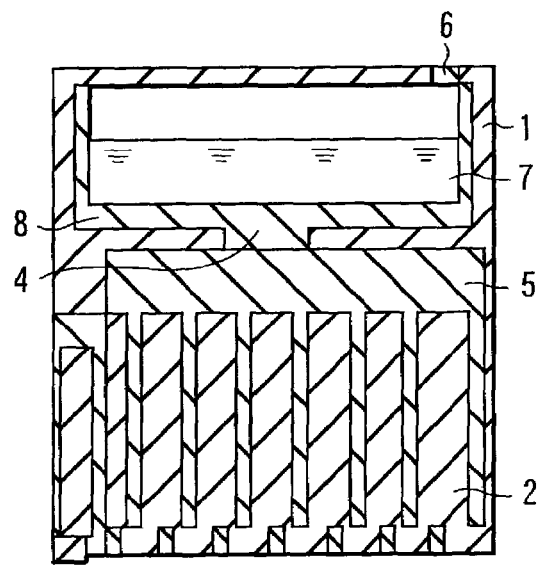
FIG. 13 schematically shows as another example the construction of a fuel cell of the present invention.

It is possible to mount the liquid fuel tank of the present invention on the upper portion of the fuel cell body, as shown in FIG. 13. To be more specific, the liquid fuel tank 1 is connected to the fuel cell body (stacked body) 2 such that the surface of the liquid fuel stored in the fuel tank 1 is perpendicular to the main surface of the electrolyte membrane included in the unit cell of the fuel cell body. Where the liquid fuel is supplied to the fuel cell body by utilizing gravitational force, it is desirable for the liquid fuel tank 1 to be arranged on the upper portion of the fuel cell body (stacked body). Where the liquid fuel tank 1 is mounted to the upper portion of the fuel cell body as shown in the drawing, it is possible to connect the tank 1 to the fuel cell body 2 such that the liquid fuel can be introduced directly into the receiver 5.

Figure 14A:
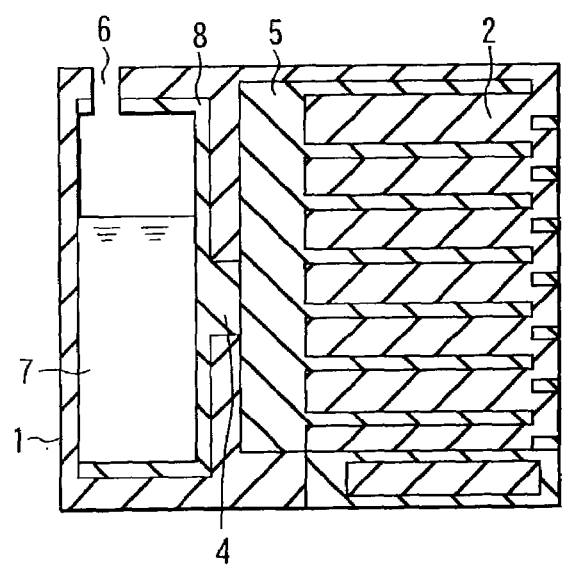
FIGS. 14A and 14B collectively show schematically as another example the construction of a fuel cell of the present invention.
Figure 14B:
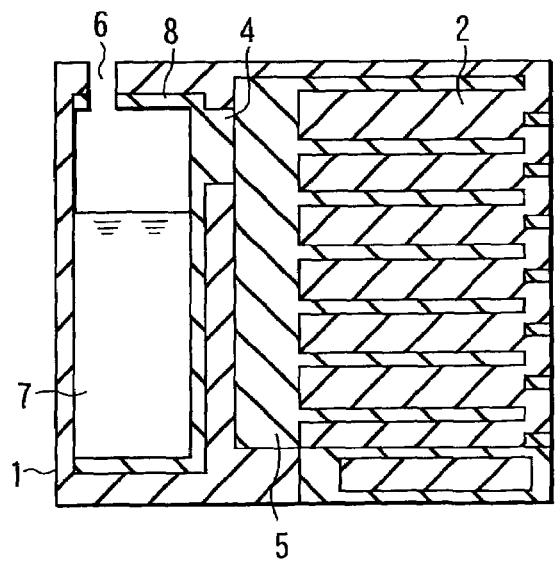

It is also possible to connect the liquid fuel tank 1 directly to the side surface of the fuel cell body 2 as shown in FIGS. 14A and 14B. In this case, it is reasonable to state that the fuel cell body is connected to the liquid fuel tank 1 such that the surface of the liquid fuel stored in the liquid fuel tank 1 is parallel to the main surface of the electrolyte membrane included in the unit cell of the fuel cell body. It is also possible to mount the liquid fuel tank 1 in a lower portion of the fuel cell body, though the particular construction is not shown in the drawing. Where the liquid fuel tank 1 is arranged on the side surface or in a lower portion of the fuel cell body (stacked body), it is possible to supply the liquid fuel to the fuel cell body by utilizing, for example, the capillary force.

In order to operate the fuel cell of the present invention for a long time, it is desirable for the liquid fuel tank 1 to be detachably connected to the fuel cell body 2. However, after the fuel tank 1 is connected to the fuel cell body 2, it is possible to fix the liquid fuel tank 1 to the pathway 3 or to the fuel cell body 2. Where the liquid fuel tank 1 is fixed to the pathway 3 or to the fuel cell body 2, it is desirable to form a fine hole 27 for replenishing the liquid fuel in a desired position, as shown in FIG. 15. In this case, the liquid fuel can be replenished through the fine hole 27 by using a liquid fuel replenishing tool 24 as shown in the drawing.

The fuel cell of the present invention, in spite of the small size, can be operated for a long time by replacing the liquid fuel tank 1 where the tank 1 is detachable or by replenishing the liquid fuel where the liquid fuel can be replenished.

It should be noted, however, that, where the liquid fuel tank is detachable, it is desirable for the remaining amount of the liquid fuel within the fuel tank to be visually seen from the outside. Likewise, where the liquid fuel tank is constructed to be capable of replenishing the liquid fuel, it is desirable for the fuel tank to be constructed such that the remaining amount of the liquid fuel can be seen from the outside so as to make it possible to confirm the timing of replenishing the liquid fuel.

Figure 17:
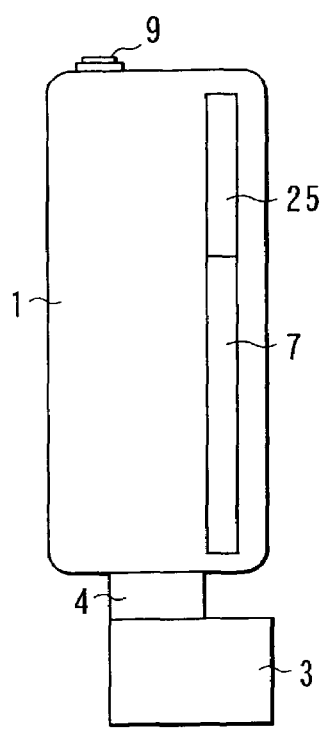
FIG. 17 schematically shows as another example the construction of a liquid fuel tank for a fuel cell of the present invention.

For example, it is possible to use a transparent or semi-transparent material for forming the liquid fuel tank 1 as shown in FIGS. 16A and 16B so as to make it possible to confirm the remaining amount of the liquid fuel from the outside. As a transparent or semi-transparent material, it is possible to use, for example, polyethylene, polypropylene, polycarbonate or a fluorine-containing resin such as polytetrafluoroethylene. Alternatively, it is possible to form a window 25 for confirming the remaining amount of the liquid fuel in a predetermined position of the liquid fuel tank 1, as shown in FIG. 17, so as to confirm the remaining amount of the liquid fuel within the fuel tank 1.

Figure 18:
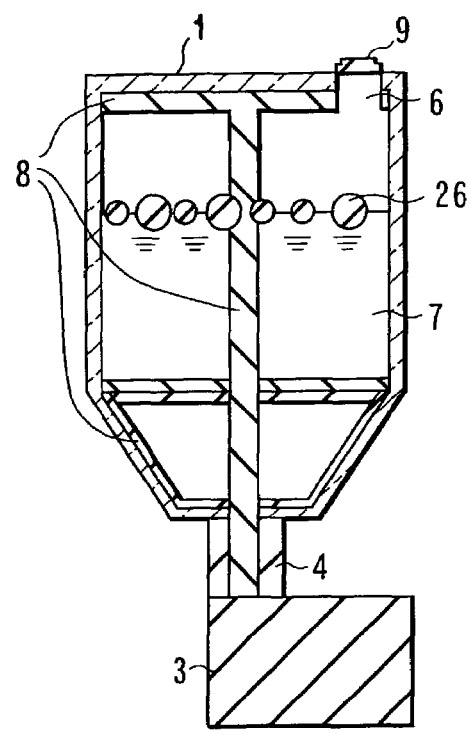
FIG. 18 schematically shows as another example the construction of a liquid fuel tank for a fuel cell of the present invention.

It is also desirable to take some measure on the side of the fuel in order to facilitate the confirmation of the remaining amount of the liquid fuel within the liquid fuel tank 1. To be more specific, the fuel can be colored with a substance that is not obstructive to the supply, vaporization and reaction of the liquid fuel. Inorganic or organic dyes, etc. can be considered as such a substance. Alternatively, it is possible to add a solid material having a specific gravity lower than that of the liquid fuel, e.g., a polystyrene foam, to the liquid fuel as a floating material. Since such a floating material 26 is always kept positioned on the surface of the liquid fuel as shown in FIG. 18, the remaining amount of the liquid fuel can be confirmed more easily by combining the floating material 26 with the liquid fuel tank 1 shown in FIG. 16 or 17. The material added to the liquid surface for detecting the surface of the liquid fuel is not limited to a solid material. It is also possible to use a liquid material such as a colored organic solvent or oil having a specific gravity lower than that of the liquid fuel.

As described above, it is possible to obtain a highly reliable fuel cell that permits ensuring a stable output by using a liquid fuel tank for a fuel cell of the present invention. Further, the liquid fuel can be supplied with a high stability even if the fuel cell body is arranged in an optional direction. In other words, the fuel supply with a high stability can be ensured regardless of the direction in which the fuel cell body (stacked body) is arranged. It follows that the scope of application of the fuel cell can be markedly widened.

The present invention will now be described more in detail with reference to Examples of the present invention.

Needless to say, the technical scope of the present invention is not limited by the following Examples.

EXAMPLE 1

In the first step, a unit cell included in the stacked body was manufactured as follows.

We prepared a fuel electrode which has, a carbon cloth coated with a Pt—Ru catalyst layer with a size of 32 mm×32 mm and an oxidant electrode which has a carbon cloth coated with a Pt black catalyst layer with a size of 32 mm×32 mm. Then, an electrolyte membrane consisting of a perfluorosulfonic acid membrane was held between the fuel electrode and the oxidant electrode such that the electrolyte membrane was in contact with the catalyst layers of the fuel electrode and the oxidant electrode. The resultant structure was bonded by hot pressing at 120° C. for 5 minutes under a pressure of 100 kg/cm$^2$ so as to obtain an electromotive section.

Then, a unit cell having a reaction area of 10 cm$^2$ was prepared as follows; first, laminating the resultant electromotive section, a carbon porous plate used as a fuel vaporizing layer which has an average pore diameter of 85 μm and a porosity of 73%, and a carbon porous plate used as a fuel permeating layer which has an average pore diameter of 5 μm and a porosity of 40%, and then arranging the resultant laminate structure between an oxidant electrode holder equipped with an oxidant gas supply groove 2 mm deep and 1 mm wide and a fuel electrode holder. Ten unit cells thus prepared were stacked one upon the other so as to obtain a fuel cell body (stacked body).

On the other hand, a mixed solution consisting of methanol and water mixed at a mixing ratio of 1:1 (molar ratio) was stored as a liquid fuel in the liquid fuel tank. A fine hole 6 having a diameter of about 5 mm was formed in the tank in the position shown in FIG. 1 and a selectively permeating film made of a fluorine-type FEP resin having a thickness of 25 μm was arranged as a mechanism for taking a mechanism against a negative pressure.

The liquid fuel tank for a liquid fuel for the fuel cell was set in a connecting section of the liquid fuel cell body as shown in FIG. 1. In this case, a connecting section constructed as shown in FIG. 9 was used for the connection between the liquid fuel tank 1 and the pathway 3. Therefore, the liquid fuel 7 within the liquid fuel tank 1 was supplied by capillary action toward the fuel electrode through the pathway 3, the receiver 5, and the carbon porous plate.

By using the fuel cell of the particular construction, power was generated at 80° C. by allowing the air of 1 atm. at 100 mL/min used as an oxidizing gas to flow through a gas channel.

As a result, it was possible to take out power having a voltage of 5.1V and a current density of 280 mA/cm$^2$. The power generation was continued for 18 hours with high stability. However, output was not lowered and was stable. The liquid fuel, i.e., a mixed solution of methanol and water, did not leak at all during operation of the fuel cell and did not leak when the liquid fuel tank was attached to and detached from the fuel cell body. These clearly support that what was prepared was a small fuel cell having a high reliability.

COMPARATIVE EXAMPLE 1

A fuel cell was prepared as in Example 1, except that used was a liquid fuel tank that did not include the fine hole as a mechanism against the negative pressure. Any of the construction of the fuel cell body, the connecting method between the fuel cell body and the liquid fuel tank, and fuel supply method and the fuel used was equal to that is Example 1.

The fuel cell thus prepared was subjected to a power generation test at 80° C. as in Example 1 by allowing the air of 1 atm. at 100 mL/min used as an oxidant gas to flow through a gas channel to reach the oxidizing electrode.

As a result, it was possible to take out power at a voltage of 4.8V and a current density of 300 mA/cm$^2$ at the initial period of the power generation. However, the output power was lowered with time. The power output after 8 hours of power generation was found to be 3.1V in voltage and 120 mA/cm$^2$ in a current density, which were markedly lower than those for Example 1.

As described above, the fuel cell for this Comparative Example 1, in which was used a liquid fuel tank not provided with a mechanism for taking a measure against a negative pressure, was found to be low in reliability.

EXAMPLE 2

A fuel cell body was prepared as in Example 1, and a receiver section made of a material through which methanol permeates easily was arranged as the receiver 5. The material used herein exhibited a permeation rate denoted by curve A shown in the graph of FIG. 19.

A liquid fuel tank that can be mounted directly on the upper portion of the fuel cell body 2 as shown in FIG. 13 was prepared, and two fine holes were formed as a measure against the negative pressure. These two fine holes were closed by caps. The two fine holes were formed diagonally apart from each other in the liquid fuel tank such that the outer air was taken into the liquid fuel tank through one of these two fine holes. Further, a liquid fuel permeating material 8 as shown in FIG. 13 was arranged in the liquid fuel tank so as to make it possible to supply the liquid fuel regardless of the direction in which the fuel cell body was arranged. The liquid fuel tank of the particular construction was set in the fuel cell body 2. In this case, a connecting section constructed as shown in FIG. 9A was used for the connection between the liquid fuel tank 1 and the fuel cell body 2.

A mixed solution consisting of methanol and water, which were mixed at the same molar amount, was housed as a liquid fuel 7 in an amount of 200 mL in the liquid fuel tank 1. The liquid fuel 7 housed in the liquid fuel tank 1 was supplied by the capillary action to the fuel electrode through the permeating material 8, the receiver 5 and the carbon porous plate. During the fuel supply, the cap 9 of the fine hole formed in an upper portion of the fuel tank 1 and used as a measure against the negative pressure was kept open.

By using the fuel cell of the particular construction, power generation was performed at 74° C. by allowing the air of 1 atm. at 100 mL/min used as an oxidizing gas to flow through the gas channel.

As a result, it was possible to take out power having a voltage of 4.6V and a current density of 240 mA/cm$^2$ three minutes after start-up of the power generating operation. The power output was not lowered and stable even after the power generation was performed for 8 hours.

During power generation of the fuel cell, the fine hole 6 of the liquid fuel tank 1, said fine hole 6 providing a measure against the negative pressure, was temporarily closed, and the liquid fuel tank was quietly turned upside down such that the fuel cell body 2 was positioned above the liquid fuel tank 1. Then, the other fine hole 6' providing a measure against the negative pressure was opened. Under this condition, the power generation was continued for 3 hours. However, a large change in the output was not recognized. This clearly supports that the fuel cell of the present invention is capable of producing power regardless of the direction in which the fuel cell body is arranged. Also, the liquid fuel, i.e., a mixed solution of methanol and water, did not leak at all during operation of the fuel cell and did not leak when the liquid fuel tank was attached to and detached from the fuel cell body. These clearly support that what was prepared was a small fuel cell having a high reliability.

COMPARATIVE EXAMPLE 2

A fuel cell was manufactured as in Example 2, except that a material poor in methanol permeability, i.e., a material having the permeating rate characteristics denoted by curve E shown in the graph of FIG. 19, was used for forming the receiver 5.

In this fuel cell, the air of 1 atm. at 100 mL/min used as an oxidizing agent was allowed to flow through the gas channel at 74° C. so as to perform power generation as in Example 2.

It has been found that the output was at last stabilized 2 hours after start-up of the operation. The voltage of the power was only 4V and the current density was only 100 mA/cm$^2$. Also, the output power was lowered with time such that the stable output power was obtained for only 30 minutes.

Further, the fine hole 6 providing a measure against the negative pressure was temporarily closed during the power generating operation, and the liquid fuel tank was quietly turned upside down such that the fuel cell body 2 was positioned on the liquid fuel tank 1 as in Example 2. Then, the other fine hole 6' providing a measure against the negative pressure was released, and the power generation was continued. It has been found that the power output was rapidly lowered, and it took one hour for the power output to be stabilized again. And the power output stabilized was as low as that before turning the stack.

EXAMPLE 3

A fuel cell body was prepared as in Example 1.

On the other hand, prepared was a liquid fuel tank for a fuel cell, which was of the type that it was possible to replenish the liquid fuel as shown in FIG. 15. Also, the liquid fuel tank was made of polycarbonate. Since the material used for forming the liquid fuel tank was semi-transparent, it was possible to visually confirm the remaining amount of the liquid fuel within the liquid fuel tank as already described in conjunction with FIGS. 16A and 16B.

The liquid fuel was prepared by mixing methanol and water at 1:1 molar ratio and colored with an organic dye used. Further, some polystyrene foam balls each having a diameter of about 5 mm, which were described previously in conjunction with FIG. 18, were added to the liquid fuel. The liquid fuel thus prepared was loaded in an amount of 50 mL in the liquid fuel tank, and the tank was connected to the fuel cell body (stacked body). In this case, a connecting section constructed as shown in FIG. 9B was used for the connection between the liquid fuel tank 1 and the pathway 3. It follows that the liquid fuel 7 in the liquid fuel tank 1 was supplied by the capillary action to the fuel electrode through the permeating material 8, the receiver 5 and the carbon porous plate described previously.

The cap 9 of the fine hole for supplying a liquid fuel and providing a measure against the negative pressure was detached. Under this condition, the air of 1 atm. at 80 mL/min used as an oxidant gas was supplied through the gas channel so as to start the power generation test of the fuel cell of the particular construction at 75° C.

As a result, it was possible to take out the output power having a voltage of 4.5V and a current density of 260 mA/cm$^2$. The output power did not change after the operation for 4 hours. In this test, since we could see the amount of the liquid fuel left in the tank from the outside, 50 mL of the liquid fuel was added to the fuel tank by using a liquid fuel replenishing tool so as to further continue the power generation test. The output power did not change even after 4 hours of additional operation. Also, a problem such as leakage of the liquid fuel was not recognized at all. Therefore, it has been confirmed that the fuel cell functions as a highly reliable fuel cell.

EXAMPLE 4

A fuel cell body was prepared as in Example 1.

On the other hand, prepared was a liquid fuel tank for a fuel cell equipped with a mechanism providing a measure against the negative pressure as shown in FIG. 3. Then, 200 mL of a mixed solution of methanol and water mixed in the same molar ratio was stored as a liquid fuel in the liquid fuel tank.

Further, the liquid fuel tank was connected to the fuel cell body so as to manufacture a fuel cell constructed as shown in FIG. 1.

As shown in FIG. 3, the fine tube 11 capable of introducing the gas generated on the side of the fuel cell body was arranged within the liquid fuel tank 1 and within the liquid absorbing material 8. One end of the fine tube 11 was open within the liquid fuel tank and the other end is open to provide a space for collecting the carbon dioxide gas generated on the side of the anode of the fuel cell body 2. Further, a pressure control valve was mounted to the fine tube 11 so as to make it possible to release the pressure through the valve over a predetermined level of pressure.

Under this condition, the air of 1 atm. at 100 mL/min used as an oxidant gas was supplied through the gas channel to the cathode so as to start the power generation test of the fuel cell of the particular construction at 65° C.

As a result, it was possible to take out the output power having a voltage of 5.1V and a current density of 270 mA/cm$^2$. The output power was not changed after the operation for 10 hours, supporting that the liquid fuel was stably supplied in a desired amount so as to perform the stable power generation.

Also, the pressure within the fuel cell body was temporarily elevated because of the carbon dioxide gas generation. However, the inner pressure not elevated further because the pressure release valve mounted to the fine tube was opened. Further, a problem such as leakage of the liquid fuel was not generated at all, supporting that the fuel cell was operated as a fuel cell having a high reliability.

EXAMPLE 5

A fuel cell body was prepared as in Example 1.

On the other hand, used was a liquid fuel tank 1 having a rotatable storage section as shown in FIG. 8B. A fine hole having a diameter of about 3 mm was formed on the wall of the tank in the liquid fuel tank, and a selectively permeable Teflon series FEP membrane having a thickness of 30 μm was arranged as a measure against the negative pressure. A liquid fuel consisting of a mixed solution of methanol and water mixed in the same molar ratio was stored in an amount of 150 mL in the liquid fuel tank, and the liquid fuel tank was connected to the fuel cell body with a flexible pathway so as to obtain a fuel cell. Incidentally, a liquid fuel permeating material was arranged within the pathway.

The liquid fuel was supplied by the capillary action to the anode side of the fuel cell constructed as described above, and the air of 1 atm. at 90 mL/min used as an oxidant gas was supplied to the cathode side through a gas channel so as to start a power generation test at 80° C.

As a result, it was possible to take out the output power having a voltage of 4.8V and a current density of 300 mA/cm$^2$. The power output was found to be stable after the power generation for about 6 hours. Also, the fuel cell body (stacked body) was inclined by about 15° during the power generating operation. However, the liquid fuel could be supplied to the fuel cell body smoothly, making it possible to continue a stable power generation.

As described above in detail, the present invention provides a highly reliable fuel cell, which permits simplifying the liquid fuel supply system, which permits stably supplying a liquid fuel, and which permits producing a stable output.

The present invention also provides a liquid fuel tank for a fuel cell, which permits vaporizing a liquid fuel and supplying a vaporized fuel with a simple structure without using a pump or a blower, making it possible for the fuel cell to produce a high output with a high stability. Also, since the liquid fuel tank is provided with a pressure adjusting mechanism, it is possible to supply a liquid fuel to the fuel vaporizing section with a high stability. As a result, it is possible to obtain a highly reliable fuel cell low in change of the output power even if the power generation is carried out continuously.

The liquid fuel can be supplied continuously from the liquid fuel tank regardless of the direction in which the fuel cell body is arranged, making it possible to use and set the fuel cell at any place and in any direction. In addition, since the flow of the liquid fuel from the liquid fuel tank is automatically started and stopped by the attachment and detachment of the liquid fuel tank respectively, the flow of the liquid fuel can be controlled easily. It is also possible to suppress an undesired outflow and vaporization of the fuel.

What is important is that the present invention makes it possible to satisfy simultaneously the requirements of a high performance and simplification of the system for the first time. The present invention has made it possible to miniaturize the fuel cell, to supply the liquid fuel with a high stability during operation of the fuel cell, and to prevent the fuel leakage, leading to manufacture of a highly reliable fuel cell. Naturally, the present invention is of a very high industrial value.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell, comprising:

a fuel cell body including a unit cell having a fuel vaporizing layer and an electromotive section including an electrolyte membrane sandwiched between a fuel electrode and an oxidant electrode, a liquid fuel being supplied into the fuel vaporizing layer and vaporized within the fuel vaporizing layer, a vaporized liquid fuel being supplied to the fuel electrode for power generation;

a liquid fuel tank having a liquid outlet port and pressure adjusting mechanism and housing a liquid fuel that is to be supplied to said fuel cell body, the pressure adjusting mechanism introducing a predetermined amount of the liquid fuel from the liquid outlet port into the unit cell; and a connecting section connecting the liquid fuel tank to the fuel cell body, the connecting section introducing said liquid fuel into said unit cell by a capillary action within the fuel cell body.

2. The fuel cell according to claim 1, wherein:

said liquid fuel tank includes a first liquid absorbing material which guides the liquid fuel to the fuel outlet port from which said liquid fuel is introduced to an outside;

a connection section to which said liquid fuel tank is connected includes a second liquid absorbing material which guides the liquid fuel to said fuel cell body; and said first liquid absorbing material and said second liquid absorbing material are brought into mutual contact to supply the liquid fuel by the capillary action.

3. The fuel cell according to claim 1, wherein:

said liquid fuel tank includes an inserting cylinder provided with a liquid outlet hole which introduces the liquid fuel from within the tank and a movable opening-closing valve; and a connecting section connected to the liquid fuel tank includes unit which opens the movable opening-closing valve.

4. The fuel cell according to claim 1, wherein said pressure adjusting mechanism consists of a hole extending through a predetermined region of an outer wall of the liquid fuel tank.

5. The fuel cell according to claim 1, wherein said liquid fuel tank includes a liquid absorbing material arranged on an inner wall of the liquid fuel tank in contact with said liquid outlet port, at least a part of said liquid absorbing material being kept in contact with said liquid fuel.

6. The fuel cell according to claim 1, wherein said pressure adjusting mechanism includes a mechanism which takes a measure against a predetermined level of pressure, and said mechanism consists of a pressure release valve mounted to the liquid fuel tank.

7. The fuel cell according to claim 1, wherein at least a part of said liquid fuel tank is formed of a transparent or semi-transparent material.

* * * * *